United States Patent
Song et al.

(10) Patent No.: US 8,661,141 B2
(45) Date of Patent: Feb. 25, 2014

(54) MANAGING A CLIENT APPLICATION SESSION BASED ON A STATUS OF A LOCAL WIRELESS CONNECTION BETWEEN PRIMARY AND SECONDARY COMMUNICATION TERMINALS

(75) Inventors: Bongyong Song, San Diego, CA (US); Mark A. Maggenti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 691 days.

(21) Appl. No.: 12/818,883

(22) Filed: Jun. 18, 2010

(65) Prior Publication Data
US 2011/0314139 A1 Dec. 22, 2011

(51) Int. Cl.
*G06F 15/16* (2006.01)

(52) U.S. Cl.
USPC .......................................... 709/227; 709/223

(58) Field of Classification Search
USPC ........................... 709/201–203, 217, 227, 228
See application file for complete search history.

(56) References Cited

U.S. PATENT DOCUMENTS

| | | | |
|---|---|---|---|
| 7,099,946 B2 * | 8/2006 | Lennon et al. ............... | 709/227 |
| 7,296,295 B2 * | 11/2007 | Kellerman et al. ........... | 726/26 |
| 7,356,771 B2 * | 4/2008 | Paul et al. .................... | 715/744 |
| 7,363,344 B1 * | 4/2008 | Coletrane et al. ............ | 709/206 |
| 7,433,956 B2 * | 10/2008 | Zhao et al. ................... | 709/228 |
| 7,546,324 B2 * | 6/2009 | Prahlad et al. ............... | 1/1 |
| 8,176,136 B2 * | 5/2012 | May et al. .................... | 709/206 |
| 8,401,520 B2 * | 3/2013 | Govindachari et al. ....... | 455/411 |
| 8,402,104 B2 * | 3/2013 | May et al. .................... | 709/206 |
| 2002/0062345 A1 * | 5/2002 | Guedalia et al. ............. | 709/204 |
| 2002/0090934 A1 * | 7/2002 | Mitchelmore ................ | 455/412 |
| 2003/0055977 A1 * | 3/2003 | Miller .......................... | 709/227 |
| 2003/0154398 A1 * | 8/2003 | Eaton et al. .................. | 713/201 |
| 2003/0195963 A1 * | 10/2003 | Song et al. ................... | 709/227 |
| 2005/0220041 A1 * | 10/2005 | Lin .............................. | 370/278 |
| 2006/0010154 A1 * | 1/2006 | Prahlad et al. ............... | 707/102 |
| 2006/0153198 A1 | 7/2006 | Chadha | |

(Continued)

FOREIGN PATENT DOCUMENTS

WO WO 2007/050126 * 11/2005
WO WO2006028456 A1 3/2006

(Continued)

OTHER PUBLICATIONS

International Search Report and Written Opinion—PCT/US2011/038125, ISA/EPO—Sep. 2, 2011.

*Primary Examiner* — Sargon Nano
(74) *Attorney, Agent, or Firm* — Raphael Freiwirth

(57) ABSTRACT

In an embodiment, a secondary communication terminal (CT) executes a client application to engage in a client application session (CAS), the secondary CT configured to connect to a primary CT over a local wireless connection (LWC), the primary CT having a higher-quality user interface environment as compared to the secondary CT. The secondary CT establishes the LWC with the primary CT during the CAS and, responsive to the establishment, negotiates with the primary CT to selectively transition the CAS to the primary CT. Alternatively, the primary CT executes the client application before the establishment and negotiates with the secondary CT to selectively transition the CAS to the secondary CT. In another embodiment, the primary CT hosts the CAS while the LWC is established with the secondary CT. Then, upon disconnection of the LWC, the secondary AT selectively transitions the CAS to the secondary CT.

38 Claims, 8 Drawing Sheets

(56) References Cited

U.S. PATENT DOCUMENTS

| | | | |
|---|---|---|---|
| 2006/0203083 A1* | 9/2006 | Wilson et al. | 348/14.02 |
| 2007/0127670 A1* | 6/2007 | Morishima et al. | 379/202.01 |
| 2007/0178874 A1* | 8/2007 | Matsuyama | 455/343.1 |
| 2007/0276715 A1* | 11/2007 | Beringer et al. | 705/7 |
| 2008/0057990 A1* | 3/2008 | Fuccello et al. | 455/507 |
| 2009/0138606 A1* | 5/2009 | Moran et al. | 709/227 |
| 2009/0248762 A1* | 10/2009 | Prahlad et al. | 707/204 |
| 2009/0284579 A1 | 11/2009 | Knaz | |
| 2011/0314389 A1* | 12/2011 | Meredith et al. | 715/751 |
| 2013/0103794 A1* | 4/2013 | Starkey | 709/217 |

FOREIGN PATENT DOCUMENTS

| | | |
|---|---|---|
| WO | WO2007050126 A1 | 5/2007 |
| WO | WO2007107982 A1 | 9/2007 |
| WO | WO2010053345 A2 | 5/2010 |

\* cited by examiner

MANAGING A CLIENT APPLICATION SESSION BASED ON A STATUS OF A LOCAL WIRELESS CONNECTION BETWEEN PRIMARY AND SECONDARY COMMUNICATION TERMINALS

BACKGROUND OF THE INVENTION

1. Field of the Invention

The invention relates to communications in a wireless telecommunication system and, more particularly to managing a client application session based on a status of a local wireless connection between primary and secondary communication terminals.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or communication terminals (CT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with CTs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (CTs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or communication terminal. A transmission of data to a single destination is referred to as "unicast". As mobile communications have increased, the ability to transmit given data concurrently to multiple communication terminals has become more important. Accordingly, protocols have been adopted to support concurrent data transmissions of the same packet or message to multiple destinations or target communication terminals. A "broadcast" refers to a transmission of data packets to all destinations or communication terminals (e.g., within a given cell, served by a given service provider, etc.), while a "multicast" refers to a transmission of data packets to a given group of destinations or communication terminals. In an example, the given group of destinations or "multicast group" may include more than one and less than all of possible destinations or communication terminals (e.g., within a given group, served by a given service provider, etc.). However, it is at least possible in certain situations that the multicast group comprises only one communication terminal, similar to a unicast, or alternatively that the multicast group comprises all communication terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a secondary communication terminal (CT) executes a client application to engage in a client application session (CAS), the secondary CT configured to connect to a primary CT over a local wireless connection (LWC), the primary CT having a higher-quality user interface environment as compared to the secondary CT. The secondary CT establishes the LWC with the primary CT during the CAS and, responsive to the establishment, negotiates with the primary CT to selectively transition the CAS to the primary CT.

Alternatively, the primary CT executes the client application before the establishment and negotiates with the secondary CT to selectively transition the CAS to the secondary CT. In another embodiment, the primary CT hosts the CAS while the LWC is established with the secondary CT. Then, upon disconnection of the LWC, the secondary AT selectively transitions the CAS to the secondary CT.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
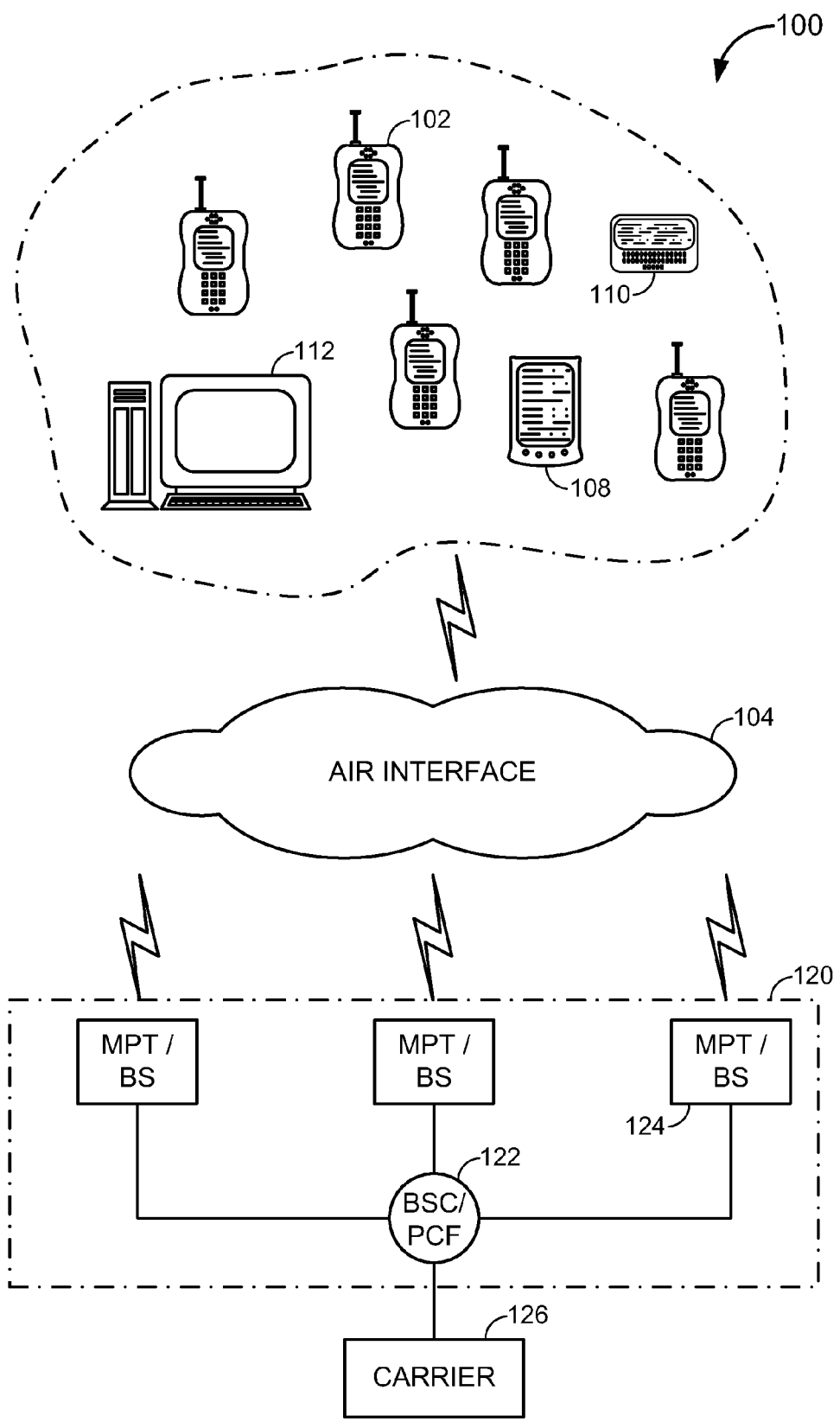
FIG. 1 is a diagram of a wireless network architecture that supports communication terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an communication terminal (CT), may be mobile or stationary, and may communicate with one or more HDR base stations, referred to herein as modem pool transceivers (MPTs) or base stations (BS). A communication terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple communication terminals.

The access network may be further connected to additional networks outside the access network, such as a corporate intranet or the Internet, and may transport data packets between each communication terminal and such outside networks. A communication terminal that has established an active traffic channel connection with one or more modem pool transceivers is called an active communication terminal, and is said to be in a traffic state. A communication terminal that is in the process of establishing an active traffic channel connection with one or more modem pool transceivers is said to be in a connection setup state. A communication terminal may be any data device that communicates through a wireless channel or through a wired channel, for example using fiber optic or coaxial cables. A communication terminal may further be any of a number of types of devices including but not limited to PC card, compact flash, external or internal modem, or wireless or wireline phone. The communication link through which the communication terminal sends signals to the modem pool transceiver is called a reverse link or traffic channel. The communication link through which a modem pool transceiver sends signals to a communication terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain communication terminals, such as cellular telephone 102, in communication across an air interface 104 with an access network or radio access network (RAN) 120 that can connect the communication terminal 102 to network equipment providing data connectivity between a packet switched data network (e.g., an intranet, the Internet, and/or carrier network 126) and the communication terminals 102, 108, 110, 112. As shown here, the communication terminal can be a cellular telephone 102, a personal digital assistant 108, a pager 110, which is shown here as a two-way text pager, or even a separate computer platform 112 that has a wireless communication portal. Embodiments of the invention can thus be realized on any form of communication terminal including a wireless communication portal or having wireless communication capabilities, including without limitation, wireless modems, PCMCIA cards, personal computers, telephones, or any combination or sub-combination thereof. Further, as used herein, the terms "communication terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote communication terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the communication terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the communication terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
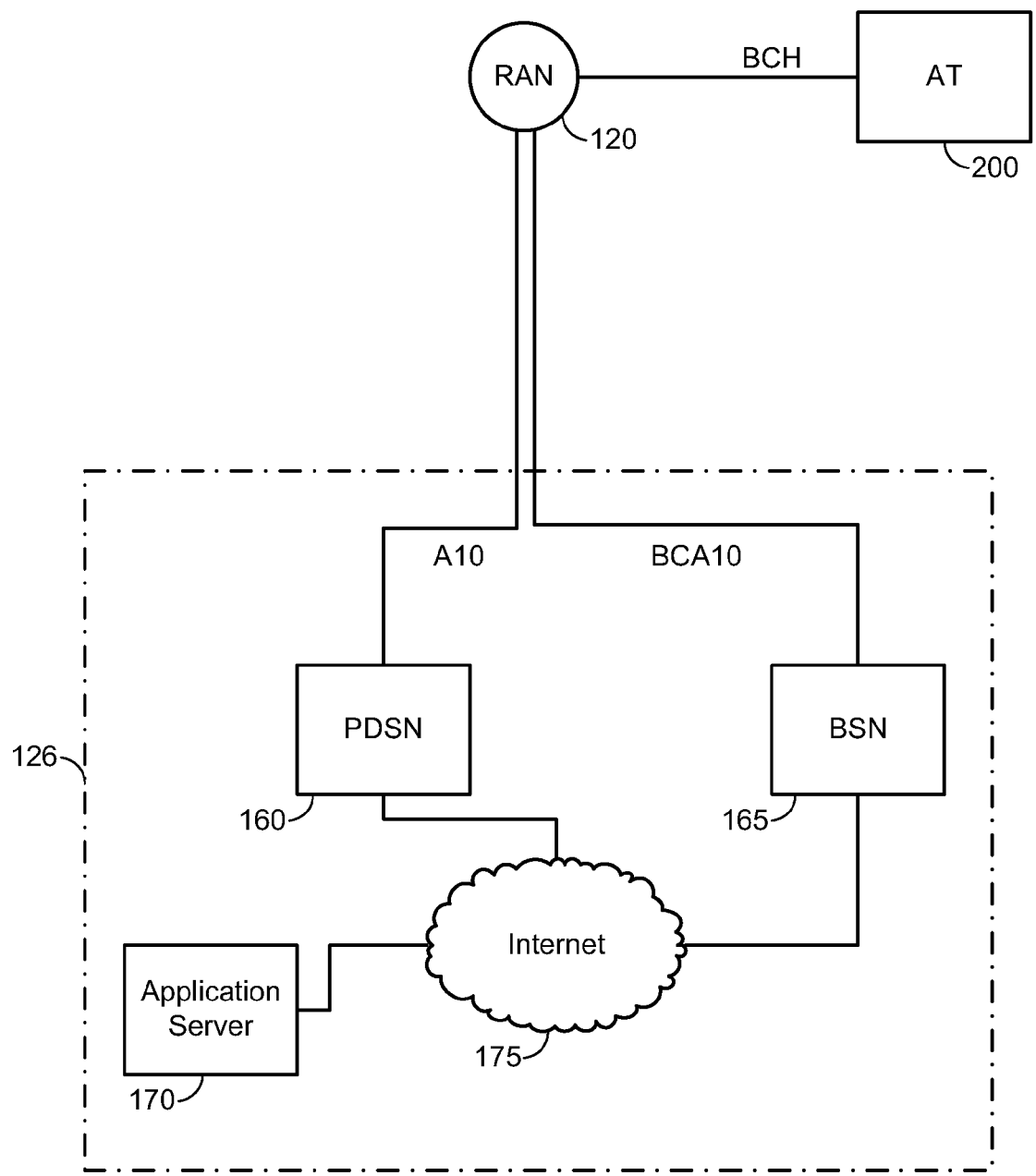
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., communication terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more communication terminals 200.

Figure 3A:
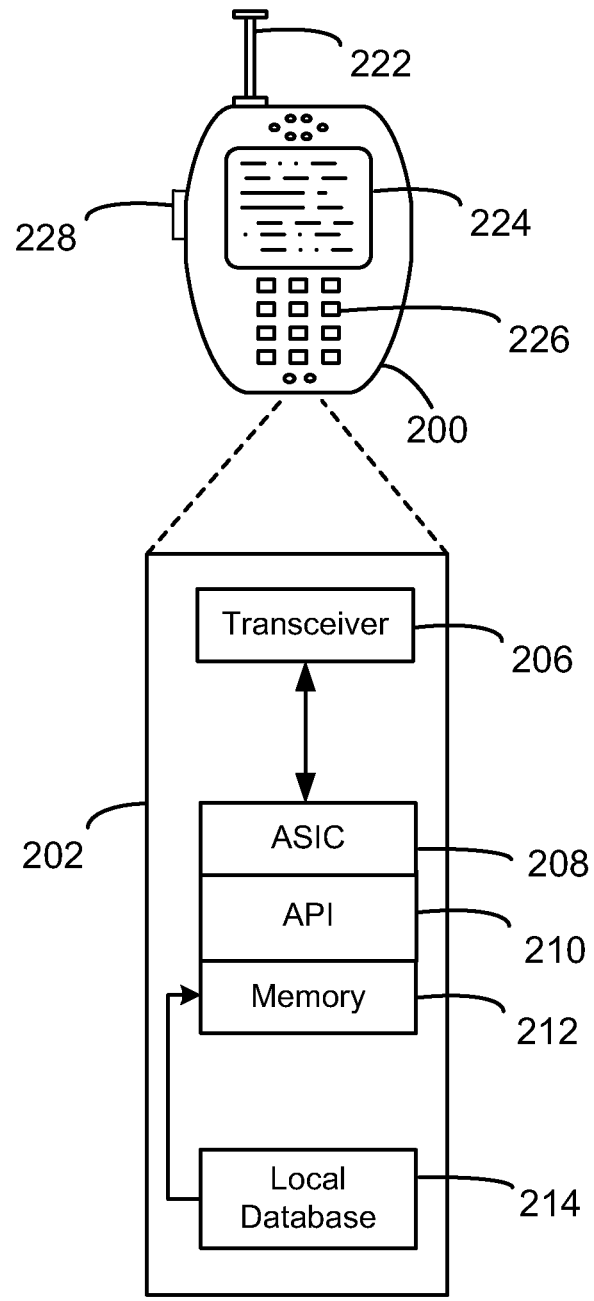
FIG. 3A is an illustration of a communication terminal in accordance with at least one embodiment of the invention.

Referring to FIG. 3A, an communication terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a communication terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the communication terminal in FIG. 3A are to be considered merely illustrative and the invention is not limited to the illustrated features or arrangement.

The wireless communication between the communication terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the communication terminal 102 access to a broader communication network. As discussed in the foregoing and known in the art, voice transmission and/or data can be transmitted to the communication terminals from the RAN using a variety of networks and configurations. Accordingly, the illustrations provided herein are not intended to limit the embodiments of the invention and are merely to aid in the description of aspects of embodiments of the invention.

Conventionally, relatively powerful computing devices (or communication terminals (CTs)) such as desktop or laptop computers, are configured to execute client applications. For example, it is common for CTs such as desktop or laptop computers to execute instant messaging (IM) applications that permit a user of the computer to exchange text, voice and/or video media with one or more other participants to an IM session. The user interface (UI) environment of the desktop or laptop computer generally has a higher-quality or more fully featured UI environment as compared to more mobile CTs such as handsets or mobile phones. For example, it is common for desktop and laptop computers to have a full keyboard, a large and/or high-resolution display and/or other peripheral devices (e.g., a printer, a mouse, a trackball, a web-cam, etc.) that increase the quality of the user's experience with the client application being executed thereon.

Increasingly, client applications like the IM application described above are being ported to lower-power CTs with a more restricted UI environment. While this extends the usability of the client application, the client application is typically embodied with reduced features on lower-power CTs, such as a smaller keyboard, a reduced-resolution display screen (e.g., a 3.5" LCD screen as compared to a large desktop or laptop monitor), fewer available services (e.g., text only for the IM application, and not voice/video), etc.

Accordingly, assume that a user is relatively far away from a primary CT (e.g., a CT with a higher-quality UI environment, such as a laptop or desktop computer station) and that the user is carrying a secondary CT (e.g., a CT with a lower-quality UI environment, such as a mobile phone or handset). In this case, if the user wishes to launch the client application, the user selects an option for launching the client application on the secondary CT because the primary CT is remote and unavailable. Later, assume the user arrives at the primary CT and begins work on the primary CT. If the user wishes to transition his/her client application session from the secondary CT to the primary CT, the user manually shuts down the client application on the secondary CT and selects an option on the primary CT for launching the client application thereon.

In another example, assume that a user is positioned at the primary CT and that the user is also carrying the secondary CT. In this case, if the user wishes to launch the client application, the user selects an option for launching the client application on the primary CT at least in part due to the UI environment provided by the primary CT over the secondary CT. Later, assume the user walks away from the primary CT. As will be appreciated, the user is no longer close enough to the primary CT to interact with the client application being executed thereon. If the user wishes to transition his/her client application session from the primary CT to the secondary CT, the user manually selects an option on the secondary CT for launching the client application thereon. The user can also shut down the client application on the primary CT before leaving the primary CT.

It will be appreciated that, in order to ensure that a desired CT is hosting a client application session for a user, manual initiation or launching of the client application on the desired CT by the user is typically required where the user has multiple CT-options for launching and/or continuing a client application session. Accordingly, embodiments of the invention are directed to managing a client application session based at least in part upon whether a primary and secondary CT are connected over a local wireless connection.

While not shown explicitly below in the embodiments of FIGS. 4A through 5B, the primary and/or secondary CT can connect to the application server 170 via the RAN 120, or alternatively can connect to the application server 170 via some other type of connection mechanism (e.g., a wired Internet connection, etc.). Thus, while FIGS. 4A through 5B illustrate the primary and secondary CTs connecting directly to the application server 170, it will be appreciated that their respective connection to the application server 170 can be mediated by any type of access network.

Figure 4A:
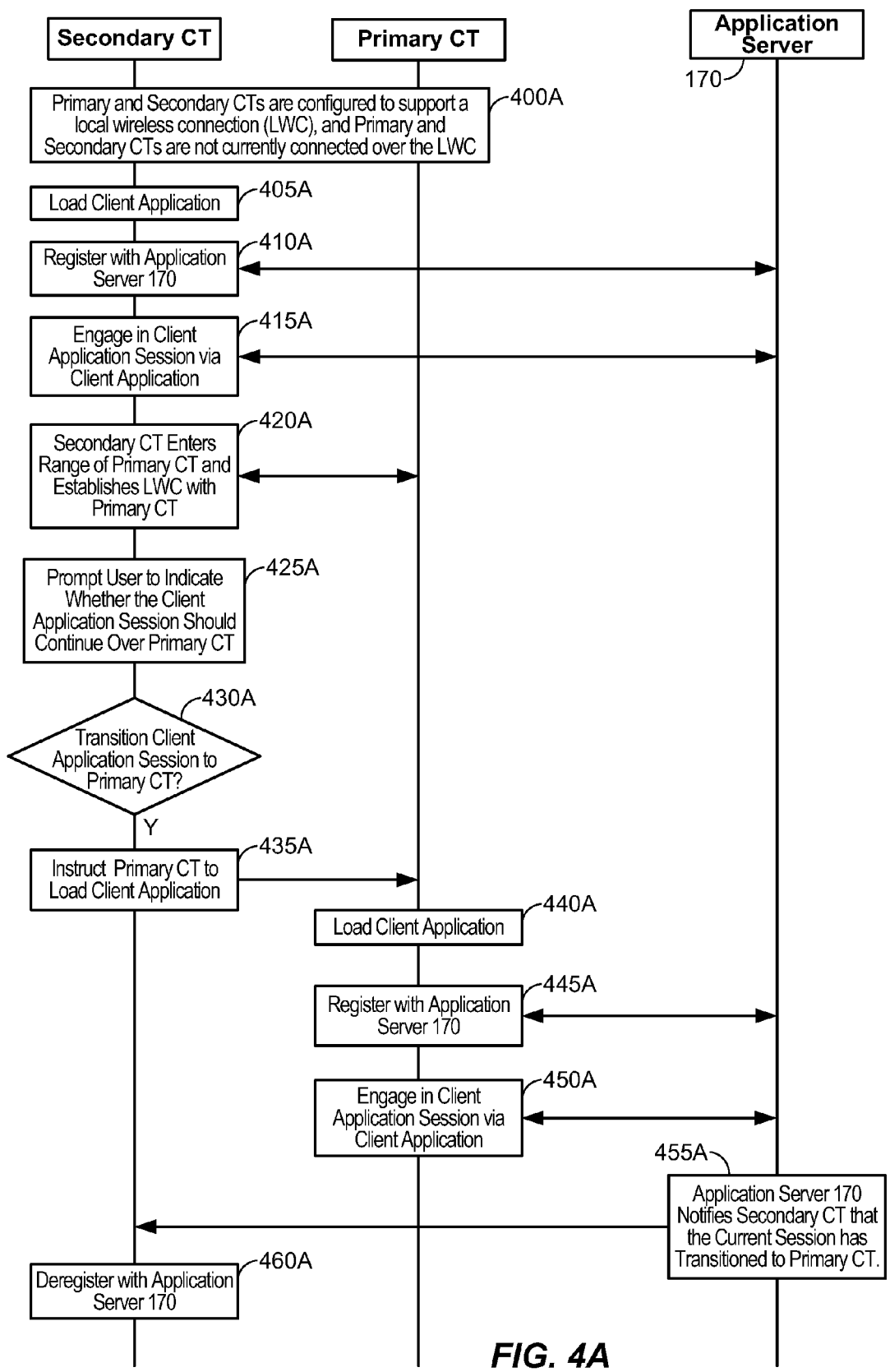
FIG. 4A illustrates a process of transitioning a client application session from a secondary communication terminal to a primary communication terminal in accordance with an embodiment of the invention.

FIG. 4A illustrates a process of transitioning a client application session from a secondary CT to a primary CT in accordance with an embodiment of the invention. As noted above, and in the embodiment of FIG. 4A, both the primary and secondary CTs are capable of executing some version of a given client application (although this need not be the same version). The primary CT corresponds to a CT that has an enhanced UI environment as compared to the secondary CT. The primary CT can be either a fixed CT (e.g., a desktop computer, etc.) or a mobile CT (e.g., a laptop computer, etc.). In an example, the primary CT can correspond to a desktop or laptop computer, a tablet computer and/or any other type of computing device that provides a convenient UI for the user (e.g., including a keyboard, a mouse, a touch-screen, a large and/or high-resolution display, a trackball and/or any other UI that is desirable to a user thereof).

The secondary CT can correspond to a mobile electronic device (e.g., a phone or handset, an MP3 player, etc.), and the secondary CT has a UI for interacting with a client application executable thereon, with the secondary CT's UI being reduced and/or different from the UI of the primary CT. For example, the secondary CT's UI can be associated with a smaller keyboard than a keyboard of the primary CT, a lower-screen resolution than a display of the primary CT, less battery life than the primary CT (e.g., which may not even require a battery for operation), etc.

The primary and secondary CTs can communicate with each other over a local wireless connection, such as a Bluetooth connection or any other type of short-range peer-to-peer wireless connection. The local wireless connection can be any wireless connection that has a relatively small connection range. Accordingly, a Bluetooth connection has a range of approximately 10 meters which is relatively small. However, a base station's connection to a mobile station can potentially be on the order of miles, which would not qualify as a local wireless connection.

Figure 3B:
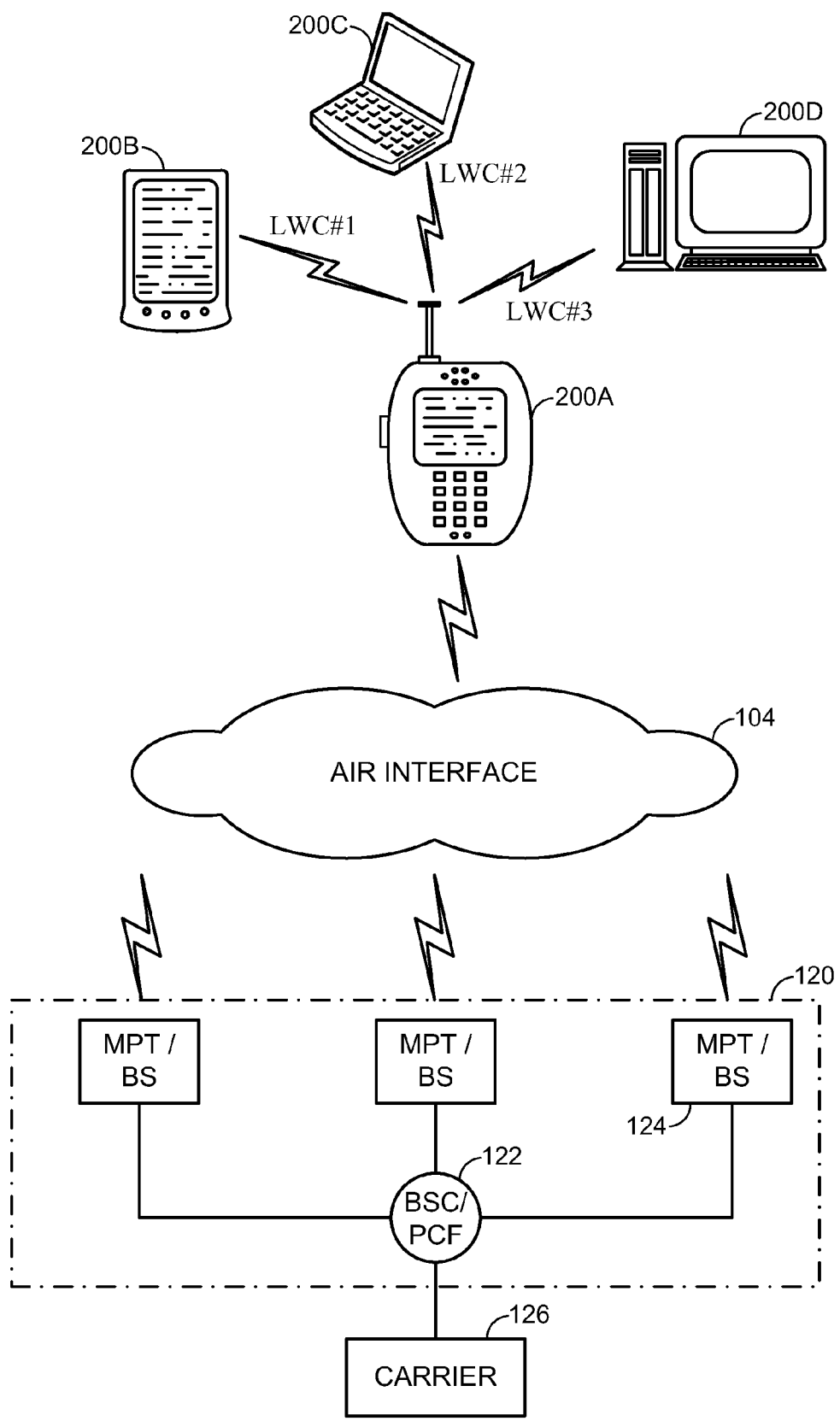
FIG. 3B is an illustration of the communication terminal of FIG. 3A deployed within the wireless communications system of FIG. 1 and further configured to support one or more local wireless connections (LWCs) in accordance with an embodiment of the invention.

FIG. 3B is an illustration of the communication terminal of FIG. 3A (denoted as 200A in FIG. 3B) deployed within the wireless communications system of FIG. 1 and further configured to support one or more local wireless connections (LWCs) in accordance with an embodiment of the invention.

As shown in FIG. 3B, the communication terminal 200A is configured to support a connection to the RAN 120 over the air interface 104, similar to FIG. 1. The communication terminal 200A is configured to further support multiple local wireless connections (LWCs) with local devices such as a touch-screen device 200B, a laptop 200C and/or a desktop computer 200D via LWCs #1, #2 and #3, respectively.

Referring to FIG. 4A, in 400A, the secondary and primary CTs are configured to support a local wireless connection (e.g., Bluetooth, etc.), and the secondary and primary CTs are not currently connected over the local wireless connection. In FIG. 4A, it may generally be assumed that the secondary CT is mobile and will be carried on the person of the user, whereas the primary CT does not necessarily travel with the user (e.g., although in at least one embodiment, the primary CT can be a mobile device such as a laptop computer which can move with the user some of the time). In at least one embodiment of the invention, the local wireless connection between the secondary and primary CTs is established whenever the secondary and primary CTs are close enough to support the local wireless connection, such that the absence of the local wireless connection implies that the secondary and primary CTs are physically or geographically separated by more than the range of the local wireless connection (e.g., although it is also possible that one or more of the secondary and primary CTs is simply turned off or otherwise disabled).

Next, in 405A, the secondary CT loads a client application in order to initiate a client application session with the application server 170. In an example, the client application can be loaded in 405A responsive to a request by a request from a user to load the client application. In an example, the client application can correspond to an IM application and the client application session thereby corresponds to an IM session. In another example, the client application can correspond to a game application and the client application session thereby corresponds to a gaming session.

After loading or launching the client application in 405A, the client application of the secondary CT registers with the application server 170 that will be supporting the client application session for the user, 410A. In an example, if the secondary CT corresponds to a mobile phone, the registration of 410A can include obtaining a traffic channel (TCH) from the RAN 120, and then sending a reverse-link registration message to the RAN 120 over the TCH to be forwarded to the application server 170, which acknowledges the registration of the secondary CT's client application.

After registering with the application server 170, the user engages, via the client application, in a client application session that is arbitrated by the application server 170, 415A. For example, if the client application session is an IM session, the client application at the secondary CT can send and/or receive IMs to and/or from other IM session participants, at the direction of the application server 170.

Next, assume that the secondary CT enters a given physical proximity (e.g., 10 meters, 40 meters, 3 feet, etc.) of the primary CT, and that the secondary CT establishes a local wireless connection with the primary CT, 420A. For example, the local wireless connection can correspond to a personal area network (PAN) including the secondary and primary CTs connected via a wireless Bluetooth connection. In another example, the secondary CT may enter the given physical proximity of the primary CT when the user carrying the secondary CT approaches the primary CT. In another example, the secondary CT may enter the given physical proximity of the primary CT when the user carrying the secondary CT turns on or powers-up the secondary CT within the given physical proximity of the primary CT, or alternatively when the user carrying the secondary CT turns on or powers-up the primary CT while carrying an already powered-up secondary CT. The connection set-up of 420A can be configured to occur automatically when the secondary CT detects or discovers the primary CT, or alternatively when the primary CT detects or discovers the secondary CT. Accordingly, the initiation of the connection set-up of 420A can be either secondary CT-initiated or primary-CT initiated.

Further, the local wireless connection need not be a direct wireless connection between the primary and secondary CTs. For example, the primary and secondary CTs can correspond to two slave Bluetooth devices in a piconet, whereby each of the primary and secondary CTs connects to the master Bluetooth device of the piconet. In another example, the primary and secondary CTs can connect to a wireless router, such that the local wireless connection is mediated by the router. In other words, the local wireless connection does not necessarily correspond to a 'direct' wireless connection, so long as the local wireless connection is 'local' such that geographical proximity can be presumed for the primary and secondary CTs when connected.

After the secondary CT completes set-up of the local wireless connection to the primary CT, the client application is notified that that the local wireless connection and the client application prompts the user to indicate whether the client application session should be transitioned to the primary CT, 425A. The prompt of 425A may be an audio alert, (e.g., a beep, etc.), a visual message (e.g., a text message of "Primary Computer Available for Session", etc.) or some other type of user-message.

The client application evaluates user-feedback in response to the prompt of 425A to determine whether to transition the client application session from the secondary CT to the primary CT in 430A. While not shown in FIG. 4A, if the user-feedback indicates the user wishes to continue the client application session via the client application on the secondary CT, the client application session continues on the secondary CT and the session is not set-up on or transitioned to the primary CT. Alternatively, if the user-feedback indicates the user wishes to transition the client application session to a client application on the primary CT, the client application of the secondary CT sends a message over the local wireless connection to the primary CT to initiate set-up of the client application session on the primary CT, 435A. For example, the message of 435A can correspond to an instruction to load the client application on the primary CT.

In an alternative example, 425A and 430A can be omitted entirely, in which case the secondary CT will automatically assume that the user wishes to transition to the primary CT upon detection of the local wireless connection. In an example, automatically transitioning the client application session from the secondary CT to the primary CT can be beneficial in reducing cellular traffic in the event that the secondary CT is connected to the application server 170 via a cellular base station and the primary CT is connected to the application server 170 via a broadband Internet connection.

Responsive to the message from 435A, the primary CT loads or launches the client application, 440A. As mentioned above, the client application configured for execution on the secondary CT need not be the same as the client application configured for execution on the primary CT. In an example, the client application configured for execution on the primary CT can correspond to a full-featured version of the client application, whereas the client application configured for execution on the secondary CT can correspond to a reduced-feature version or mobile-version of the client application. For example, in the context of an IM client application, the client application configured for execution on the secondary CT can correspond to a mobile IM client. The client application session may thereby differ somewhat for the user when interacting with the different versions of the client applications on the primary and secondary CTs.

After loading the client application in 440A, the client application of the primary CT registers with the application server 170 that will be supporting the client application session for the user over the primary CT, 445A. In an example, if the primary CT corresponds to a desktop computer, the registration of 445A can include sending a message to the application server 170 via an Internet connection. After registering with the application server 170 at the primary CT, the user continues to engage, via the client application, in the client application session that is arbitrated by the application server 170 over the primary CT, 450A.

In a further example, it is possible that old-session information can be conveyed to the primary CT related to the history of the client application session from when the session was conducted via the secondary CT. For example, if the client application session is an IM session, the IM messages or conversations that occurred during 415A can be conveyed to the primary CT so that the user may scroll back to earlier IM messages/conversations while using the primary CT. In this case, the session history information can either be received at the primary CT from the secondary CT in 435A, or alternatively from the application server 170 during or after the primary CT's registration in 445A.

After the primary CT successfully sets-up the client application session via its own client application in 450A, the application server 170 notifies the secondary CT that the client application session has transitioned to the primary CT, 455A. The secondary CT then deregisters from the current session with the application server 170, 460A. After the de-registration of 460A, the secondary CT may shut down or close the client application.

In an alternative embodiment, the secondary CT and primary CT can be configured for concurrent session-participation, such that the de-registration step of 460A is omitted. In this case, both the primary and secondary CTs are registered with the application server 170 for the client application session after 445A. Thus, if the client application session is an IM session, IM sessions intended for the user are sent by the application server 170 to the primary and secondary CTs when both CTs are registered, IMs sent from the secondary CT to a target CT would be conveyed to the primary CT so that the IM conservation displayed on the primary CT was up-to-date, and so on.

Figure 4B:
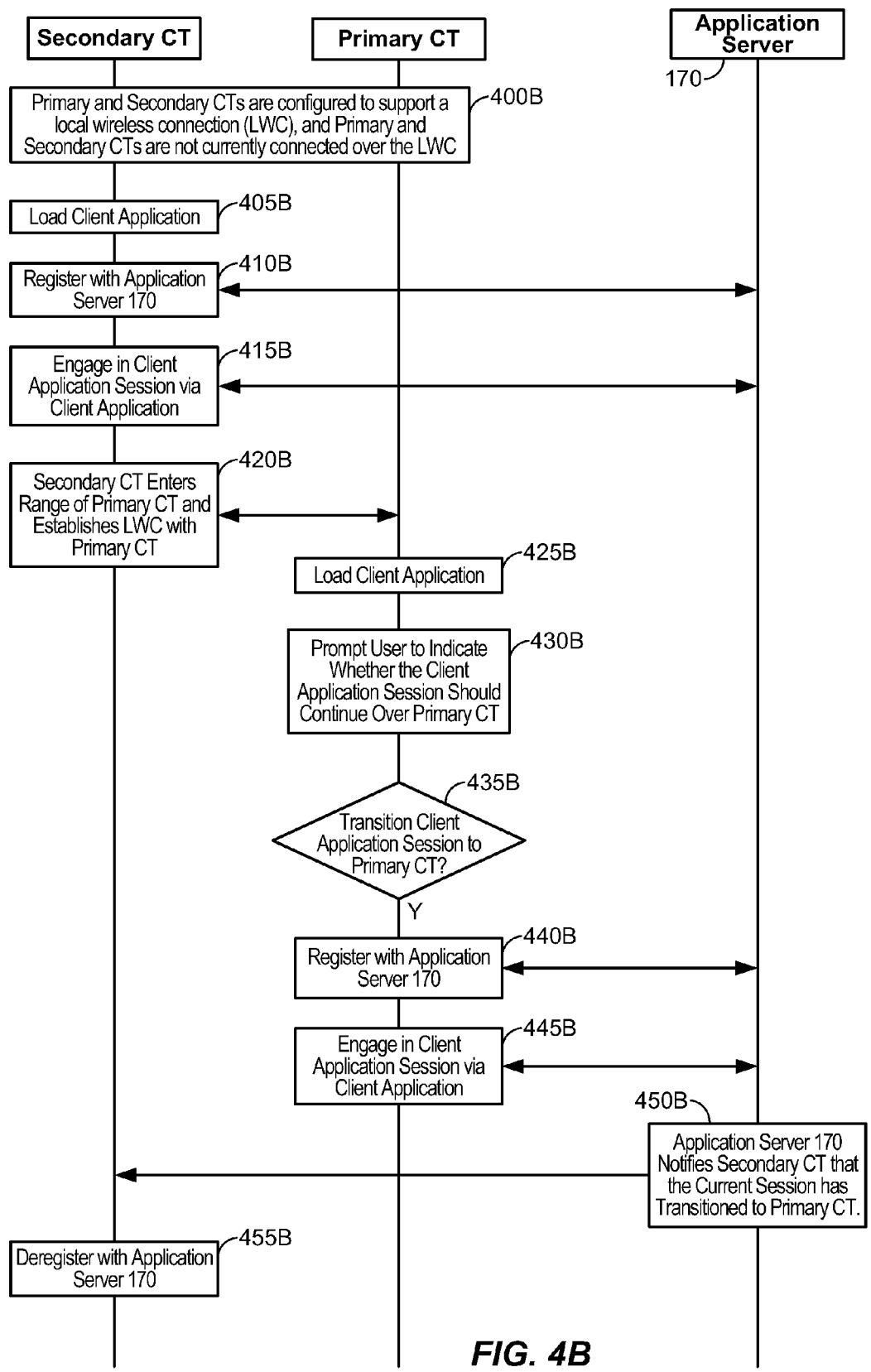
FIG. 4B illustrates another process of transitioning a client application session from a secondary communication terminal to a primary communication terminal in accordance with another embodiment of the invention.

FIG. 4B illustrates another process of transitioning a client application session from a secondary CT to a primary CT in accordance with another embodiment of the invention. 400B through 420B of FIG. 4B generally correspond to 400A through 420A of FIG. 4A, respectively, and as such will not be described in further detail for the sake of brevity.

In FIG. 4A, establishing the local wireless connection between the secondary and primary CTs triggers the secondary CT to prompt the user for feedback relating to whether the client application session should be transitioned to the primary CT. By contrast, in the embodiment of FIG. 4B, the user-prompt is provided via the primary CT instead of the secondary CT. Accordingly, the establishment of the local wireless connection between the secondary and primary CTs triggers the primary CT to load the client application 425B, after which the client application prompts the user to indicate whether the client application session should be transitioned from the secondary CT to the primary CT, 430B. Similar to 425A of FIG. 4A, the prompt of 430B may be an audio alert, (e.g., a beep, etc.), a visual message (e.g., a text message of "Primary Computer Available for Session", etc.) or some other type of user-message. As will be appreciated, the prompt of 430B can occur before the client application of the primary CT registers with the application server 170 because it is possible the user will want to continue the client application session on the secondary CT.

The client application of the primary CT evaluates user-feedback in response to the prompt of 430B to determine whether to transition the client application session from the secondary CT to the primary CT in 435B. While not shown in FIG. 4B, if the user-feedback indicates the user wishes to continue the client application session via the client application on the secondary CT, the client application session continues on the secondary CT and is not set-up on the primary CT. In this case, while not shown in FIG. 4B, the primary CT would simply shut down the client application loaded in 425B.

Alternatively, if the user-feedback indicates the user wishes to transition the client application session to a client application on the primary CT, the client application of the primary CT registers with the application server 170 that will be supporting the client application session for the user over the primary CT, 440B. After registering with the application server 170 at the primary CT, the user continues to engage, via the client application, in the client application session that is arbitrated by the application server 170 over the primary CT, 445B.

As discussed with respect to FIG. 4A, in a further example, it is possible that old-session information can be conveyed to the primary CT related to the history of the client application session from when the session was conducted via the secondary CT. For example, if the client application session is an IM session, the IM messages or conversations that occurred during 415B can be conveyed to the primary CT so that the user may scroll back to earlier IM messages/conversations while using the primary CT. In this case, the session history information can either be received from the application server 170 during or after the primary CT's registration in 440B, or received at the primary CT from the secondary CT during or after the de-registration of 450B (discussed below). Session history information may be more valuable for certain type of applications such as a gaming application where the current gaming activity relies on the past activity (gaming context, current score, etc).

After the primary CT successfully sets-up the client application session via its own client application in 440B and 445B, the application server 170 notifies the secondary AT that the current session has transitioned to the primary CT, 450B. At this point, the secondary CT can de-register from the application server 170 such that the client application session continues thereafter only on the primary CT, 455B. While the notification of 450B arrives from the application server 170 in FIG. 4B, the de-registration of 455B may be triggered by a message from the primary CT in another embodiment of the invention. After the de-registration of 455B, the secondary CT may shut down or closes the client application.

Figure 5A:
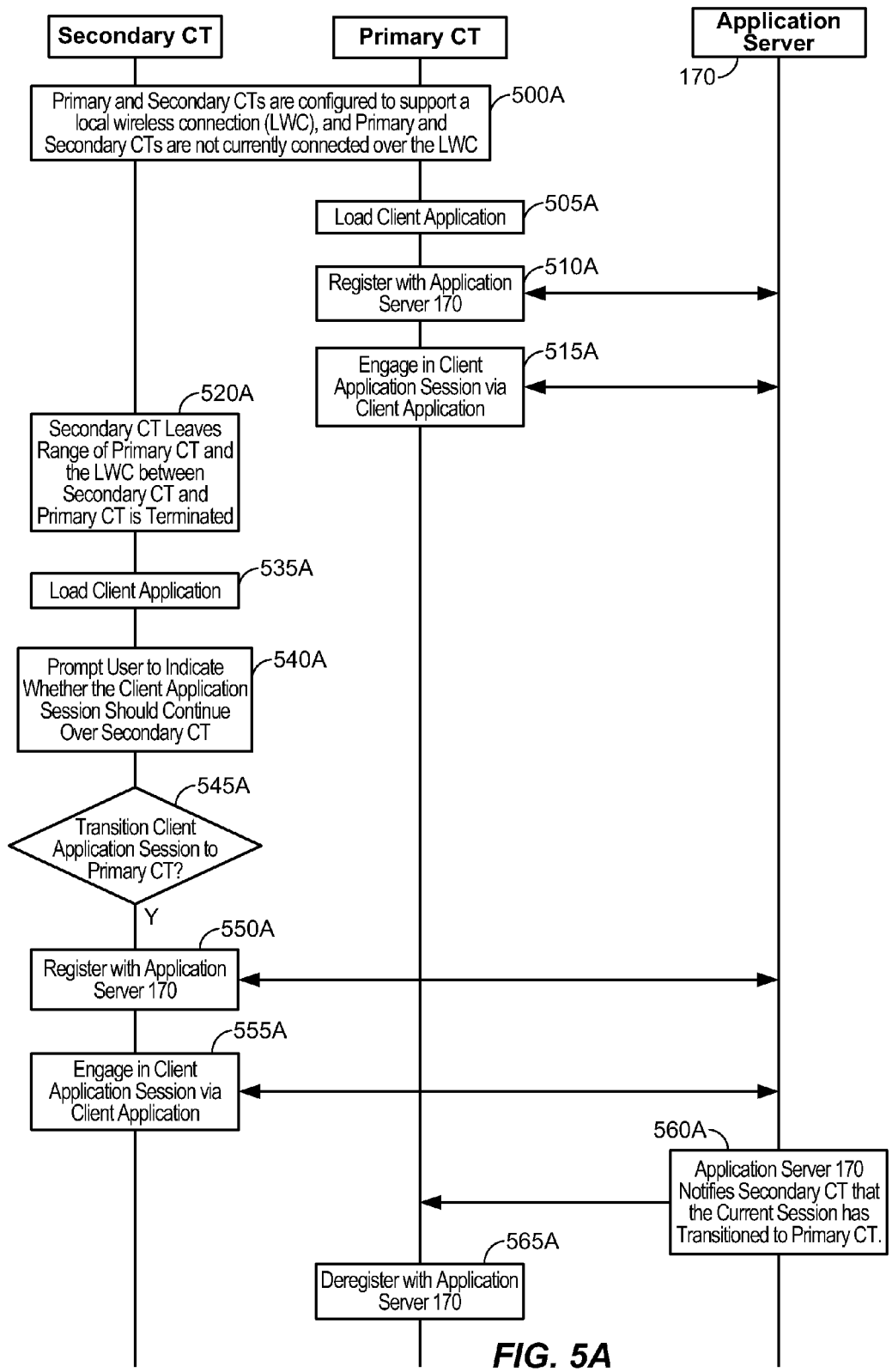
FIG. 5A illustrates a process of transitioning a client application session from the primary communication terminal to the secondary communication terminal in accordance with an embodiment of the invention.
Figure 5B:
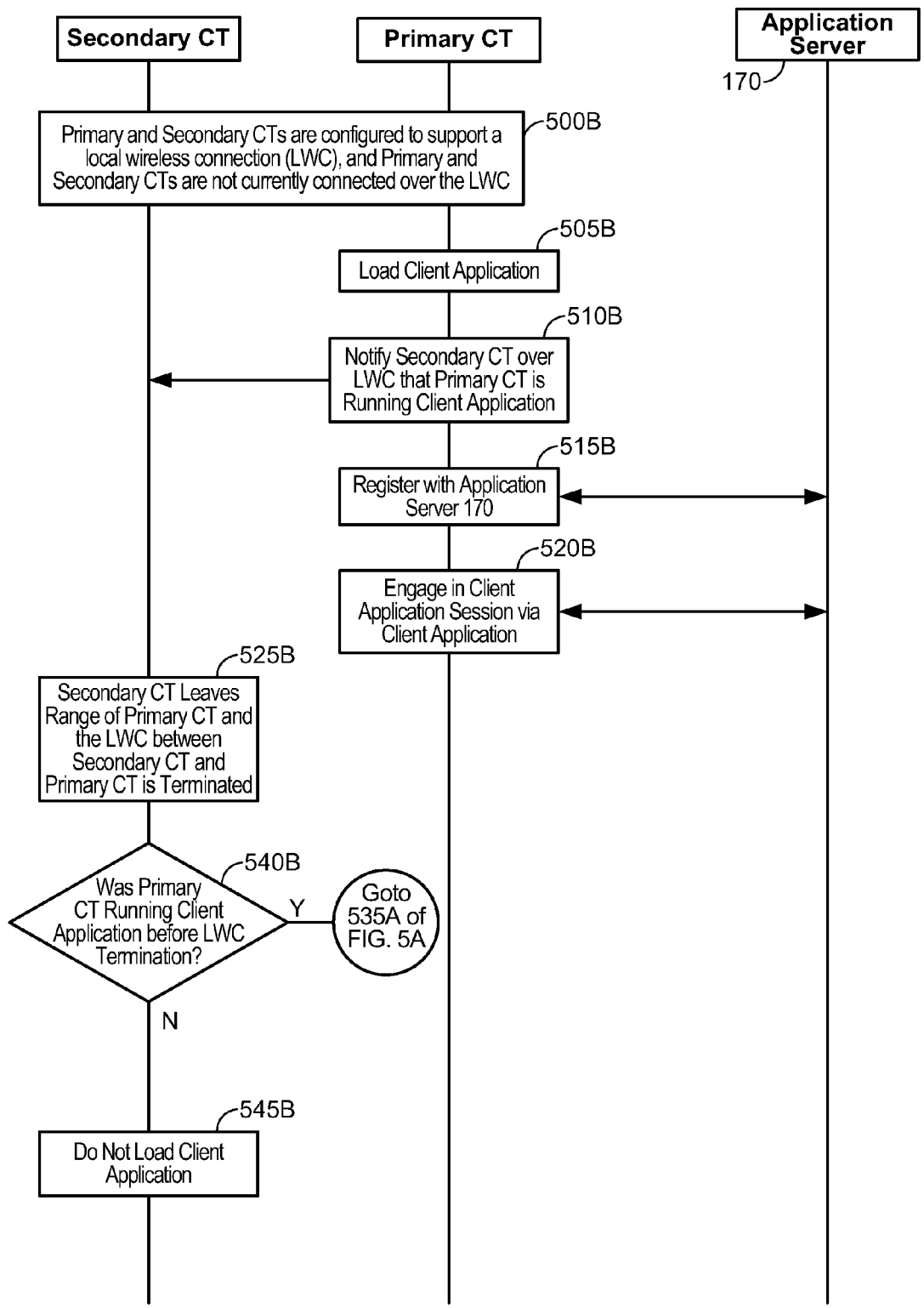
FIG. 5B illustrates another process of transitioning a client application session from a primary communication terminal to a secondary communication terminal in accordance with another embodiment of the invention.

While the embodiments of FIGS. 4A and 4B are directed to a client application session transitioning from the secondary CT to the primary CT, the embodiments of FIGS. 5A and 5B are directed to a client application session transitioning from the primary CT to the secondary CT. For example, assuming the primary CT corresponds to a desktop or laptop computer and the secondary CT corresponds to a mobile phone, the user can initiate a client application session on the primary CT to make use of its UI environment. Later, the user decides to travel to a destination remote from the primary CT. The user carries the secondary CT during this travel and thereby continues the client application session over the secondary CT at least until returning back to the primary CT. In this case, as discussed below with respect to FIGS. 5A and 5B, the disconnection of the local wireless connection between the primary and secondary CTs can be configured to trigger the transition of the client application session from the primary CT to the secondary CT.

Further, while FIG. 4A illustrates a prompt at 425A upon establishment of the LWC in 420A and FIG. 4B illustrates a prompt at 430B after establishment of the LWC in 420B and loading of the primary CT's client application in 425B, in another embodiment of the invention, a hybrid approach can be adopted whereby both the secondary CT can perform the prompt (as in FIG. 4A) and the primary CT can also perform the prompt (e.g., as in FIG. 4B). In context of FIG. 4B, in an example, the hybrid approach could be achieved by moving 425A and 430A after 420B of FIG. 4B. Then, if the user responded via the secondary CT instead of the primary CT, the secondary CT could signal the primary CT to perform the transition. Thus, the user could respond to either prompt in the hybrid approach to trigger the transition between the secondary CT and the primary CT, with blocks 440B and onwards being performed in response to the user's feedback to the prompt from either CT.

FIG. 5A illustrates a process of transitioning a client application session from the primary CT to the secondary CT in accordance with an embodiment of the invention. Referring to FIG. 5A, in 500A, the secondary and primary CTs are configured to support a local wireless connection (e.g., Bluetooth, etc.), and secondary and primary CTs are currently connected over the local wireless connection. As in FIG. 4A, it may generally be assumed that the secondary CT is mobile and will be carried on the person of the user, whereas the primary CT does not necessarily travel with the user (e.g., although in at least one embodiment, the primary CT can be laptop computer which can move with the user some of the time). In at least one embodiment of the invention, the local wireless connection between the secondary and primary CTs is established whenever the secondary and primary CTs are close enough to support the local wireless connection, such that the absence of the local wireless connection implies that the secondary and primary CTs are physically or geographically separated by more than the range of the local wireless connection.

Next, in 505A, the primary CT loads a client application in order to initiate a client application session with the application server 170. In an example, the client application can be loaded in 505A responsive to a request by a request from a user to load the client application. After loading the client application in 505A, the client application of the primary CT registers with the application server 170 that will be supporting the client application session for the user, 510A (e.g., as in 445A of FIG. 4A or 440B of FIG. 4B). After registering with the application server 170, the user engages, via the client application, in a client application session that is arbitrated by the application server 170, 515A. For example, if the client application session is an IM session, the client application at the primary CT can send and/or receive IMs to and/or from other IM session participants.

Next, assume that the secondary CT exits a given physical proximity of the primary CT, and that the local wireless connection between the primary CT and secondary CT is thereby disconnected, 520A. For example, the user may walk away from the primary CT while carrying the secondary CT, which causes the local wireless connection to drop out due to the gap caused by the travel of the user.

Upon detecting that the local wireless connection between the primary CT and secondary CT has disconnected, the secondary CT assumes that the user is no longer in proximity of the primary CT, and thereby the secondary CT loads the client application, 535A, after which the client application of the secondary CT prompts the user to indicate whether the client application session should set-up on the secondary CT, 540A.

The client application evaluates user-feedback in response to the prompt of 540A to determine whether to set-up the client application session at the secondary CT in 545A. While not shown in FIG. 5A, if the user-feedback indicates the user does not wish to set-up the client application session on the secondary CT, then the secondary CT simply shuts-down the client application and does not initiate the client application session at the secondary CT. Alternatively, if the user-feedback indicates the user wishes to set-up the client application session at the secondary CT, the process advances to 550A. In an alternative example, 540A and 545A can be omitted entirely, in which case the secondary CT will automatically assume that the user wishes to set-up the client application session whenever the secondary CT detects the local wireless connection to the primary CT to be disconnected.

Referring to FIG. 5A, in 550A, the client application of the secondary CT registers with the application server 170 that will be supporting the client application session for the user over the primary CT. After registering with the application server 170 at the secondary CT, the user continues to engage, via the client application, in the client application session that is arbitrated by the application server 170 over the secondary CT, 555A.

Once the secondary CT registers with the application server 170, the application server 170 notifies the primary CT that the session has transitioned to the secondary CT, 560A. The client application of the primary CT then de-registers from the client application session with the application server 170, 565A, after which the client application may optionally be shut down or closed by the primary CT. In an example, the de-registration of 565A can occur after a threshold time period from the disconnection of 520A expires, and need not occur instantly upon the notification from the application server 170 in 560A. In another example, the client application session can simply be maintained by the client application at the primary CT, such that the de-registration of 565A and optional shut-down of the client application on the secondary CT need not be performed in other embodiments of the invention.

In a further example, it is possible that old-session information can be conveyed to the secondary CT related to the history of the client application session from when the session was conducted via the primary CT. For example, if the client application session is an IM session, the IM messages or conversations that occurred during 515A can be conveyed to the secondary CT so that the user may scroll back to earlier IM messages/conversations while using the primary CT. In this case, the session history information can either be received from the application server 170 during or after the secondary CT's registration in 550A, or received at the secondary CT from the primary CT before the disconnection of the local wireless connection in 520A (e.g., via event-triggered and/or periodic messages from the primary CT to the secondary CT while the two CTs are connected).

FIG. 5B illustrates another process of transitioning a client application session from a primary CT to a secondary CT in accordance with another embodiment of the invention. 500B through 505B of FIG. 5B generally correspond to 500A through 505A of FIG. 5A, respectively, and as such will not be described in further detail for the sake of brevity.

In the embodiment of FIG. 5B, the primary CT is configured to inform the secondary CT with regard to when the primary CT is executing the client application while the local wireless connection between the primary and secondary CTs is active. In this case, because the local wireless connection between the secondary and primary CTs is active (500B), and the client application is loaded or launched by the primary CT (505B), the primary CT sends a notification to the secondary CT over the local wireless connection to inform that secondary CT that the primary CT is running the client application, 510B. Next, 520B through 535B correspond to 515A through 530A of FIG. 5A, respectively, and as such will not be described further for the sake of brevity.

In FIG. 5A, upon detecting that the local wireless connection between the primary CT and secondary CT has disconnected, the secondary CT simply loaded the client application (535A) and then prompted the user with regard to whether to establish the client application session via the secondary CT (540A). However, in FIG. 5A, the secondary CT does not necessarily have special knowledge related to the client application's execution on the primary CT. Instead, 535A and 540A are simply triggered with the local wireless connection between the secondary and primary CTs is broken.

In the embodiment of FIG. 5B, upon detecting that the local wireless connection between the primary CT and secondary CT has disconnected, the secondary CT determines whether the secondary CT had been notified that the primary CT was executing the client application, 540B. For example, upon receipt of the client application notification from the primary CT in 505B, the secondary CT can set a given register to a state that indicates the primary CT to be executing the client application, and the given register can then be checked upon disconnection of the local wireless connection in 540B.

If the secondary CT determines that the primary CT was executing the client application before the disconnection or termination of the local wireless connection between the secondary and primary CTs in 540B, then the process advances to 535A of FIG. 5A whereby the client application session is set-up on the secondary CT. Otherwise, if the secondary CT determines that the primary CT was not executing the client application before the disconnection or termination of the local wireless connection between the secondary and primary CTs in 540B, then the secondary CT does not load the client application, 545B. Accordingly, FIG. 5B demonstrates that the secondary CT can load the client application and prompt the user for permission to set-up the client application session selectively based on whether the user was previously engaged in the session with the primary CT, which can improve the user experience with the client application by refraining from badgering the user when the user does not wish to engage in a session.

While many of the examples provided above with respect to the embodiments have been given with respect to IM sessions and IM client applications, it will be appreciated that other embodiments of the invention can be directed to other types of client applications and client application sessions, including but not limited to email, gaming, etc. Further, while above-described embodiments have generally been directed to 'transitions' from one CT to another CT for hosting a client application session, it will be appreciated that the old CT hosting the session need not necessarily drop out when the session is established with the new CT. Thus, the same session can be hosted concurrently on multiple CTs in at least one embodiment of the invention.

Further, it will be appreciated that the secondary CT is likely to come across many potential local wireless connection opportunities with different CTs while being carried or moved by the user throughout a particular environment. For example, in an office environment, numerous computers and other wireless devices may advertise themselves wirelessly to the secondary CT. In this case, the triggering of the client application at the secondary CT and the other processes described in the embodiments above may be conditioned upon specific primary CTs, and not any CT that the secondary CT happens to discover. For example, the user of the secondary CT may manually instruct the secondary CT with regard to which primary CTs the user desires to achieve seamless transitions for client application sessions of the client application. Accordingly, the evaluation of whether the secondary CT is authorized to trigger client application loading and/or transition for a particular target CT can occur at the secondary CT upon establishment of a local wireless connection with the target CT.

While above-described embodiments have been described with respect to server-arbitrated client application sessions (i.e., arbitrated by the application server 170), other embodiments can be directed to local client application sessions that are not necessarily arbitrated by the application server 170. For example, assume that a user is operating his/her primary CT, has a LWC to the secondary CT and is playing a game that does not require server-arbitration (e.g., Solitaire, Tetris, etc.). Later, the user walks away from the primary CT and down the hall out of LWC range with his/her secondary CT. In this embodiment, the game state could be conveyed to the user's secondary CT from the primary CT (i.e., prior to the LWC disconnection) and the mobile-version of the game could be loaded with the same game-state on the secondary CT (e.g., the same block arrangements from a Tetris game on the primary CT could be loaded on the mobile-Tetris application on the secondary CT). As will be appreciated, yet another embodiment could be implemented where the LWC is established and/or when the client application session can transition from the secondary CT to the primary CT. In these alternative embodiments, interactions between the primary and secondary CTs and the application server 170 (e.g., such as registrations and/or de-registrations to/from the application server 170) as shown in FIGS. 4A through 5B can be omitted.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., communication terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of managing a client application session within a communications network, comprising:
    executing a client application to engage in the client application session at a secondary communication terminal, the secondary communication terminal configured to connect to a primary communication terminal over a local wireless connection, the primary communication terminal having a higher-quality user interface environment as compared to the secondary communication terminal;
    establishing the local wireless connection between the secondary communication terminal and the primary communication terminal during the client application session; and
    responsive to the establishment of the local wireless connection, negotiating with the primary communication terminal in order to transition the client application session from the secondary communication terminal to the primary communication terminal, wherein the negotiation relies upon the primary communication terminal to register itself with an application server configured to arbitrate the client application session to facilitate the transition of the client application session from the secondary communication terminal to the primary communication terminal.

2. The method of claim 1, further comprising:
    after the establishing step, prompting a user of the secondary communication terminal to indicate whether the user desires to transition the client application session from the secondary communication terminal to the primary communication terminal; and
    performing the negotiating step if the user responds to the prompt with an indication to transition the client application session.

3. The method of claim 2, wherein the prompting step occurs at the secondary communication terminal and not the primary communication terminal.

4. The method of claim 2, wherein the prompting step occurs at the secondary communication terminal and the primary communication terminal.

5. The method of claim 1, wherein the negotiating step includes:
    sending, from the secondary communication terminal to the primary communication terminal, an instruction over the local wireless connection for the primary communication terminal to load the client application.

6. The method of claim 1, wherein the negotiating step includes:
    receiving a notification that informs the secondary communication terminal that the client application session has been transitioned to the primary communication terminal.

7. The method of claim 6, further comprising:
    de-registering the secondary communication terminal from the client application session in response to the notification.

8. The method of claim 6, wherein the notification is received from the application server.

9. The method of claim 1, wherein the client application session corresponds to an Instant Messaging (IM) session or a gaming session.

10. The method of claim 1, wherein the client application session at the primary and/or secondary communication terminals is arbitrated by the application server.

11. The method of claim 1, wherein the local wireless connection is a Bluetooth connection.

12. The method of claim 1, wherein the secondary communication terminal is a mobile communications device.

13. The method of claim 12, wherein the primary communication terminal is another mobile communications device.

14. The method of claim 12, wherein the primary communication terminal is not a mobile communications device.

15. The method of claim 1, wherein the higher-quality user-interface environment of the primary communication terminal includes, as compared to a user-interface environment of the secondary communication terminal, one or more of (i) a larger or higher-resolution display, (ii) different user-input options and/or (iii) access to one or more additional peripheral devices.

16. The method of claim 1, wherein the client application session is supported by different versions of the client application on the primary and secondary communication terminals.

17. The method of claim 16, wherein the primary communication terminal's version of the client application is more fully-featured than the secondary communication terminal's version of the client application.

18. A method of managing a client application session within a communications network, comprising:
   establishing a local wireless connection between a secondary communication terminal and a primary communication terminal during the client application session, the client application session hosted by the secondary communication terminal via a client application being executed thereon, the primary communication terminal having a higher-quality user interface environment as compared to the secondary communication terminal; and
   responsive to the establishment of the local wireless connection, negotiating with the secondary communication terminal in order to transition the client application session from the secondary communication terminal to the primary communication terminal, wherein the negotiation includes the primary communication terminal registering itself with an application server configured to arbitrate the client application session to facilitate the transition of the client application session from the secondary communication terminal to the primary communication terminal.

19. The method of claim 18, further comprising:
   after the establishing step, prompting a user of the primary communication terminal to indicate whether the user desires to transition the client application session from the secondary communication terminal to the primary communication terminal; and
   performing the negotiating step if the user responds to the prompt with an indication to transition the client application session.

20. The method of claim 19, wherein the prompting step occurs at the primary communication terminal and not the secondary communication terminal.

21. The method of claim 19, wherein the prompting step occurs at the primary communication terminal and the secondary communication terminal.

22. The method of claim 19, further comprising:
   loading the client application on the primary communication terminal in response to the establishment of the local wireless connection,
   wherein the prompting step occurs responsive to the loading step.

23. The method of claim 18, wherein the client application session corresponds to an Instant Messaging (IM) session or a gaming session.

24. The method of claim 18, wherein the client application session at the primary and/or secondary communication terminals is arbitrated by the application server.

25. The method of claim 18, wherein the local wireless connection is a Bluetooth connection.

26. The method of claim 18, wherein the secondary communication terminal is a mobile communications device.

27. The method of claim 26, wherein the primary communication terminal is another mobile communications device.

28. The method of claim 26, wherein the primary communication terminal is not another mobile communications device.

29. The method of claim 18, wherein the higher-quality user-interface environment of the primary communication terminal includes, as compared to a user-interface environment of the secondary communication terminal, one or more of (i) a larger or higher-resolution display, (ii) different user-input options and/or (iii) access to one or more additional peripheral devices.

30. The method of claim 18, wherein the client application session is supported by different versions of the client application on the primary and secondary communication terminals.

31. The method of claim 30, wherein the primary communication terminal's version of the client application is more fully-featured than the secondary communication terminal's version of the client application.

32. A secondary communication terminal configured to manage a client application session within a communications network, comprising:
   means for executing a client application to engage in the client application session, the secondary communication terminal configured to connect to a primary communication terminal over a local wireless connection, the primary communication terminal having a higher-quality user interface environment as compared to the secondary communication terminal;
   means for establishing the local wireless connection between the secondary communication terminal and the primary communication terminal during the client application session; and
   means for, responsive to the establishment of the local wireless connection, negotiating with the primary communication terminal in order to transition the client application session from the secondary communication terminal to the primary communication terminal, wherein the negotiation relies upon the primary communication terminal to register itself with an application server configured to arbitrate the client application session to facilitate the transition of the client application session from the secondary communication terminal to the primary communication terminal.

33. A primary communication terminal configured to manage a client application session within a communications network, comprising:
   means for establishing a local wireless connection between a secondary communication terminal and the primary communication terminal during the client application session, the client application session hosted by the secondary communication terminal via a client application being executed thereon, the primary communication terminal having a higher-quality user interface environment as compared to the secondary communication terminal; and
   means for, responsive to the establishment of the local wireless connection, negotiating with the secondary communication terminal in order to transition the client application session from the secondary communication terminal to the primary communication terminal, wherein the negotiation includes the primary communication terminal registering itself with an application server configured to arbitrate the client application session to facilitate the transition of the client application session from the secondary communication terminal to the primary communication terminal.

34. A secondary communication terminal configured to manage a client application session within a communications network, comprising:
   logic configured to execute a client application to engage in the client application session, the secondary communication terminal configured to connect to a primary communication terminal over a local wireless connection, the primary communication terminal having a higher-quality user interface environment as compared to the secondary communication terminal;
   logic configured to establish the local wireless connection between the secondary communication terminal and the primary communication terminal during the client application session; and
   logic configured to, responsive to the establishment of the local wireless connection, negotiate with the primary communication terminal in order to transition the client application session from the secondary communication terminal to the primary communication terminal, wherein the negotiation relies upon the primary communication terminal to register itself with an application server configured to arbitrate the client application session to facilitate the transition of the client application session from the secondary communication terminal to the primary communication terminal.

35. A primary communication terminal configured to manage a client application session within a communications network, comprising:
   logic configured to establish a local wireless connection between a secondary communication terminal and the primary communication terminal during the client application session, the client application session hosted by the secondary communication terminal via a client application being executed thereon, the primary communication terminal having a higher-quality user interface environment as compared to the secondary communication terminal; and
   logic configured to, responsive to the establishment of the local wireless connection, negotiate with the secondary communication terminal in order to transition the client application session from the secondary communication terminal to the primary communication terminal, wherein the negotiation includes the primary communication terminal registering itself with an application server configured to arbitrate the client application session to facilitate the transition of the client application session from the secondary communication terminal to the primary communication terminal.

36. A secondary communication terminal configured to manage a client application session within a communications network, comprising:
   logic configured to establish a local wireless connection between the secondary communication terminal and a primary communication terminal, the primary communication terminal having a higher-quality user interface environment as compared to the secondary communication terminal;
   logic configured to determine that the local wireless connection between the secondary communication terminal and the primary communication terminal has been disconnected; and
   logic configured to, responsive at least in part to the disconnection determination, selectively transition the client application session, which is hosted by the primary communication terminal via a client application being executed thereon prior to the disconnection, to the secondary communication terminal.

37. A non-transitory computer-readable storage medium containing instructions stored thereon, which, when executed by a secondary communication terminal configured to manage a client application session within a communications network, cause the secondary communication terminal to perform operations, the instructions comprising:
   program code to execute a client application to engage in the client application session, the secondary communication terminal configured to connect to a primary communication terminal over a local wireless connection, the primary communication terminal having a higher-quality user interface environment as compared to the secondary communication terminal;
   program code to establish the local wireless connection between the secondary communication terminal and the primary communication terminal during the client application session; and
   program code to, responsive to the establishment of the local wireless connection, negotiate with the primary communication terminal in order to transition the client application session from the secondary communication terminal to the primary communication terminal, wherein the negotiation relies upon the primary communication terminal to register itself with an application server configured to arbitrate the client application session to facilitate the transition of the client application session from the secondary communication terminal to the primary communication terminal.

38. A non-transitory computer-readable storage medium containing instructions stored thereon, which, when executed by a primary communication terminal configured to manage a client application session within a communications network, primary the secondary communication terminal to perform operations, the instructions comprising:
   program code to establish a local wireless connection between a secondary communication terminal and the primary communication terminal during the client application session, the client application session hosted by the secondary communication terminal via a client application being executed thereon, the primary communication terminal having a higher-quality user interface environment as compared to the secondary communication terminal; and
   program code to, responsive to the establishment of the local wireless connection, negotiate with the secondary communication terminal in order to transition the client application session from the secondary communication terminal to the primary communication terminal, wherein the negotiation includes the primary communication terminal registering itself with an application server configured to arbitrate the client application session to facilitate the transition of the client application session from the secondary communication terminal to the primary communication terminal.

* * * * *